United States Patent
Gordon et al.

(10) Patent No.: US 12,411,941 B2
(45) Date of Patent: Sep. 9, 2025

(54) USER DEFINED VALIDATION ON CONTENT STORED IN A STORAGE SYSTEM

(71) Applicant: VAST DATA LTD., Tel Aviv (IL)

(72) Inventors: Eyal Gordon, Tel Aviv (IL); Asaf Levy, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 133 days.

(21) Appl. No.: 17/305,664

(22) Filed: Jul. 12, 2021

(65) Prior Publication Data
US 2023/0010437 A1  Jan. 12, 2023

(51) Int. Cl.
| | |
|---|---|
| H04L 29/06 | (2006.01) |
| G06F 21/54 | (2013.01) |
| G06F 21/55 | (2013.01) |
| G06F 21/56 | (2013.01) |
| G06F 21/62 | (2013.01) |

(52) U.S. Cl.
CPC ............ *G06F 21/54* (2013.01); *G06F 21/552* (2013.01); *G06F 21/562* (2013.01); *G06F 21/6218* (2013.01)

(58) Field of Classification Search
CPC ...... G06F 21/54; G06F 21/552; G06F 21/562; G06F 21/6218; G06F 21/51; G06F 21/52
See application file for complete search history.

(56) References Cited

U.S. PATENT DOCUMENTS

| | | | | |
|---|---|---|---|---|
| 10,044,801 | B1* | 8/2018 | Tyurumov | H04L 67/1095 |
| 11,539,711 | B1* | 12/2022 | Miller | H04L 63/1483 |
| 2005/0102154 | A1* | 5/2005 | Dodd | G06Q 30/0279 |
| | | | | 705/329 |
| 2013/0086479 | A1* | 4/2013 | Brown | G06F 16/972 |
| | | | | 715/741 |
| 2013/0179649 | A1* | 7/2013 | Green | G06F 3/0673 |
| | | | | 711/E12.002 |
| 2018/0276415 | A1* | 9/2018 | Barday | G06F 21/6254 |
| 2019/0266130 | A1* | 8/2019 | Barday | H04L 63/108 |
| 2022/0318371 | A1* | 10/2022 | Slik | G06F 21/51 |

* cited by examiner

*Primary Examiner* — Evans Desrosiers
(74) *Attorney, Agent, or Firm* — Reches Patents

(57) ABSTRACT

A method for user-defined validation of content stored in a storage system, the method may include receiving a request to execute a user-defined validation process (UDVP) on the content that is stored in the storage system; wherein the request is associated with means for executing the UDVP, and a content identifier; scheduling, by the storage system, at least one execution of the UDVP; executing the UDVP according to the scheduling to provide one or more validation results; and finding that the one or more validation results are indicative of potential security issues and performing one or more validation-triggered security measures.

21 Claims, 3 Drawing Sheets

USER DEFINED VALIDATION ON CONTENT STORED IN A STORAGE SYSTEM

TECHNICAL FIELD

The present disclosure generally relates to the field of data storage, and more particularly to performing user defined validation on content stored in a storage system.

BACKGROUND

Storage systems employ various measures for protecting stored data. Such measures include access control, encryption, backup and restore, various error correction techniques, and more.

However, the storage system is not aware of the content that is stored, other than being encapsulated in files, directories, logical volumes, buckets, objects, etc. Therefore, the storage system is not capable of executing content-aware validations.

The accessing entities (e.g., a user of the storage system, the applications running on servers that are coupled to the storage system for the purpose of storing and accessing stored data) are aware of the content, but their access is limited to general purpose commands of the accessing protocols, such as various NAS, object or SAN protocols, that include commands for performing data IO, metadata management, and the like.

There is a need to provide, to a user of a storage system, the ability of accessing the content stored in a storage system, in a different manner, other than the standard data and metadata access, so as to conduct content aware validations, particularly, for detecting malware and malicious damages.

SUMMARY

There may be provide a storage system, a method and a non-transitory computer readable medium for user defined validation on content stored in a storage system.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
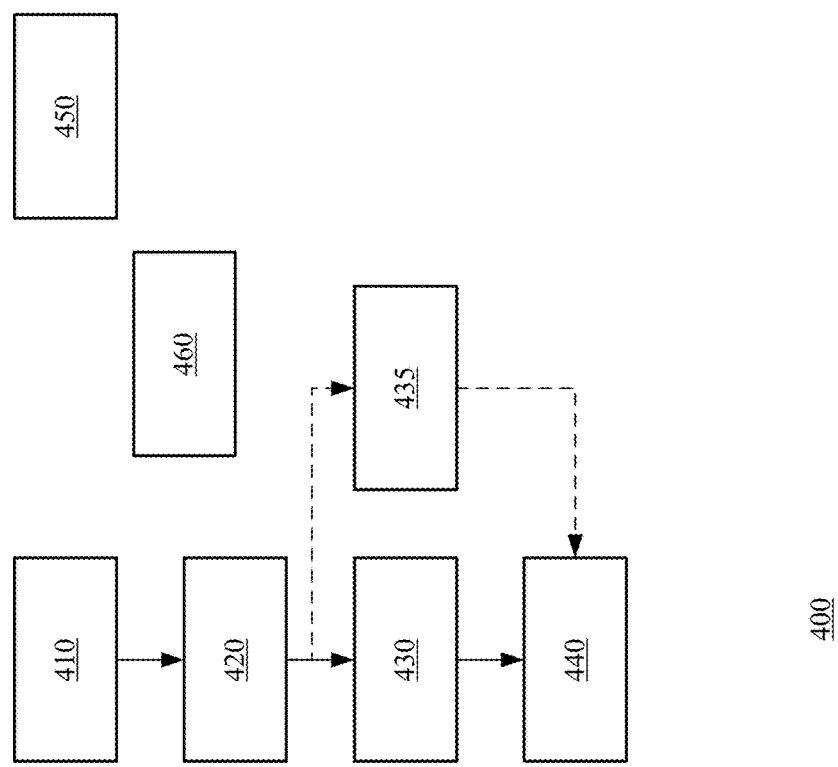
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute entity, a compute element and a compute node, that are used interchangeably. The compute node may be a server, computer, a cloud container, and the like. Any one of the compute entity and compute element can be a compute node, processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The present system, method and non-transitory computer readable medium are for user defined validation on content stored in a storage system.

The storage system and methods of the present invention allow accessing entities that are coupled to the storage system to provide a user-defined validation program, to be executed on content that was stored by the accessing entities and/or permitted to be accessed by these accessing entities. The accessing entities may be user applications executed by users, application servers, or any other computing devices that are coupled to the storage system.

The storage system may further define or alternatively, allow the accessing entities to provide validation rules that define triggers for execution, such as event driven execution and scheduled execution. The storage system may further define or allow the accessing entities to provide definitions of protective actions to be taken in response to the execution results.

The storage system may further define or allow the accessing entities to provide modification rules that define the way that the already implemented validation rules can be modified or deleted.

The storage system can receive from the accessing entity a request for executing a user-defined validation program, where the request may include program code, such as a script or an executable code, or may include access information for enabling execution of the user-defined program, e.g., a link to an application or a container where the code resides.

A container is an executable unit of software in which application code is packaged, along with its libraries and dependencies, so the application can be abstracted from the environment in which it actually run, therefore it can be run anywhere: on desktop, laptop server, private data center or public cloud.

The validation program may be, for example: code compilation (if the addressed directory stores software code), Database query (e.g., SQL command or script—if the addressed directory stored database tables and indices). The validation program may be any program that checks the integrity of the content as a whole, in contrast to checking bit errors, block errors, filesystem integrity or any check that is related to the stored data and not to the particular content.

The accessing entity further provides an identifier of a stored entity that is permitted to be accessed by the accessing entity, for example, a pathname, a mount point (a directory) that will be the subject of the program execution, i.e., will serve as the program input. The stored entity identifier may identify a working version, an older version such as a snapshot, a clone, etc.

The storage system may determine or obtain from the accessing entity a trigger for executing the validation program. The trigger may include (i) timing for periodic execution or (ii) an event for triggering the execution, e.g., prior to deleting a snapshot, prior to performing a certain backup (e.g., hourly, daily or weekly backup). The timing for execution may be any point in time that precedes a storage operation that is to be prevented from being performed if the validation program, after executed, will indicate a suspicious state.

The system may determine, or may obtain from the accessing entity, protective actions to be taken upon detecting a suspicious state by the validation program. The protective actions may include, for example: pausing any access to the storage system, pausing write requests, or pausing other specific access requests, preventing taking snapshots, preventing deleting snapshots, preventing performing backups, pausing replication processes or migration processes, sending alerts, etc. The protective actions may be stopped, or the paused/prevented actions may be resumed when the state that was detected by the validation program is fixed, or when a resume request is received from an authorized user.

The system may apply different protection actions for different undesired results of the validation program. The accessing entity may provide a mapping between results of the validation program and the required protective action for each result, or may just indicate what is considered as an undesired result. The accessing entity may provide a mapping between various undesired results and the severity of these results, and the system may initiate protective action in response to the severity of the results, for example, high severity will result pausing of access requests, while a lower severity will result pausing deletion of snapshots.

Once the accessing entity has defined validation rules and provided the user-defined validation program, the storage system schedules the validation program according to the validation rules and according to the execution measures available to the storage system. For example, when the program is provided as a container, the system may select the compute resources for executing the container: e.g., a public cloud, a private cloud, on one of the compute nodes included in the storage systems. The selecting may be based on the cost of using compute resources of the public cloud, the availability of compute resources in the private cloud or the system's servers, etc. When the program is provided as an executable code, the system may still configure a container for the executable code or may decide to execute the program in a different manner.

If the trigger for execution is defined as a periodic execution, the system will schedule the validation program to be executed according to the defined timing, which may include, for example, absolute time or a period length.

The system may define the program as a serverless application, where a container is spun up to run in accordance with the certain event that is defined as the execution trigger. The container is then taken down when the execution is completed.

Serverless application uses serverless computing which is a cloud computing execution model in which the cloud provider allocates machine resources on demand. Serverless applications are event-driven and may be executed only upon occurrence of a pre-defined event According to the schedule and the execution measures taken by the system, the system enables the execution of the validation program and provides to the validation program one or more stored entities (e.g., directories, sub-directories, files, objects associated with the stored entity identifier pathname) that was provided by the accessing entity. In case the validation program runs in a container, stored entities associated with the stored entity identifier will be attached to the container via CSI (container storage interface).

The storage system may take precautions before or during the execution of the validation program to ensure a trusted execution, such as: scan vulnerabilities of the program, check that the program is safe, verify the integrity of the program and make sure that it does not harm stored data, tries to modify data, or accesses data that is not permitted to be accessed by the accessing entity that provided the validation program.

The system obtains the results of the execution of the validation program, determines whether the results indicate an irregular or suspicious state, and if so—applies protective actions according to the results.

The storage system manages validation rules DB. The system allows modification or deletion of validation rules only according to predefined modification rules, e.g., requiring approval from an authorized user, requiring approval from 2 users, delaying execution of the deletion by a certain time period and requiring a second approval after the expiration of the certain time period. The user that added the rule is not necessarily the one that can delete it.

FIG. 1 is an example of a method 400 for user-defined validation of content stored in a storage system.

Method 400 may start by step 410 of receiving a request to execute a user-defined validation process (UDVP) on the content that is stored in the storage system. The request is associated with means for executing the UDVP, and a content identifier.

The request is associated with the content identifier in the sense that it may include the content identifier, may include a link or other information for retrieving the content identifier, that there may be any mapping between the request and the content identifier, or that the content identifier may be linked to the request in any other manner. The request is associated with the means for executing the UDVP in the sense that it may include an executable code, a script, a link to an application or a container, or any other association with a validation program provided by the user.

The means for executing the UDVP may be included in a container. The content identifier may be attached to the container via a container storage interface or by using any other means for providing input to a container.

The request may be associated with one or more other metadata or information.

For example—the request may be associated with scheduling information indicative of a requested timing of the at least one instance of execution of the UDVP. In this case step 420 may be responsive to the scheduling information. The scheduling information may be indicative of a requested timing of multiple instances of execution of the UDVP, for example by providing a periodic schedule.

The request may be associated with one or more triggers for triggering the executing of the UDVP.

Step 410 may be followed by step 420 of scheduling, by the storage system, at least one execution of the UDVP.

Step 420 may be followed by step 430 of executing the UDVP according to the scheduling to provide one or more validation results. Step 420 may include (or may be preceded by) determining the execution means for executing the UDVP and the compute resources for the execution, e.g., whether to use the compute resources of the storage system and execute the UDVP within the storage system, whether to execute the UDVP as a container and the compute resources (internal or external) to execute the UDVP container.

The request may be associated with one or more triggers for triggering the executing of the UDVP.

The trigger may be a storage operation regarding at least a part of the content.

In this case—the execution of the storage operation may be responsive to validation result provided by an execution of the instance of the UDVP. For example—the execution may be cancelled, delayed, accelerated, based on the validation result. For example—the method may include delaying an execution of the storage operation until fixing a problem detected by the execution of the UDVP.

The storage operation may be selected out of generating a backup, deleting a backup, generating a snapshot, and deleting a snapshot.

Step 430 may be followed by step 440 of finding that the one or more validation results are indicative of potential security issues and performing one or more validation-triggered security measures.

The one or more validation results are determined to be indicative of potential security issues in any manner—based on rules, based on machine learning, and the like. The one or more validation results may be indicative of specific potential security issues, or may just provide an indication that the storage system malfunctions.

Step 440 may include determining whether the one or more validation results are indicative of potential security issues and if so—performing one or more validation-triggered security measures. The performing one or more validation-triggered security measures should eliminate or reduce the risk imposed from the potential security issues.

Method 400 may also include step 435 of applying one or more UDVP execution related security measures during the executing of the UDVP.

The one or more UDVP execution related security measures may include applying one or more access control rules related to the user. For example—preventing the validation to access data of another user.

Step 430 is executed according to one or more validation rules. A validation rule may be applicable to one user or to multiple users, to one validation program or to multiple validation programs.

The validation rules may be stored in any manner—for example in a data structure of validation rules to be applied during one or more UDVPs.

The validation rules may be added, deleted or amended.

Method 400 may include step 450 of managing the validation rules. This step may include controlling the addition, deletion or amendments of the validation rules. This may be controlled, for example by validation rules management information.

Step 450 may include receiving a request to amend at least one validation rule and determining, based on at least one validation amendment rule (for example of the validation rules management information), whether to accept the request.

Step 450 may include receiving a request to delete at least one validation rule and determining, based on at least one validation amendment rule, whether to accept the request.

Step 450 may include receiving a request from a first user to amend or delete at least one validation rule defined by a second user; and determining, based on at least one rule (for example—of validation rules management information), whether to accept the request.

Method 400 may also include step 460 of applying one or more preliminary security measures before the executing of the UDVP.

Step 460 may be executed before step 430. It may be executed before step 420 of scheduling or after the scheduling.

If detecting that the execution of the UDVP is not safe enough then the execution of the UDVP may be cancelled, delayed till any security issue is fixed, and the like.

Step 460 may include at least one out of scanning for vulnerabilities of the UDVP, and verifying an integrity of the UDVP.

Figure 2:
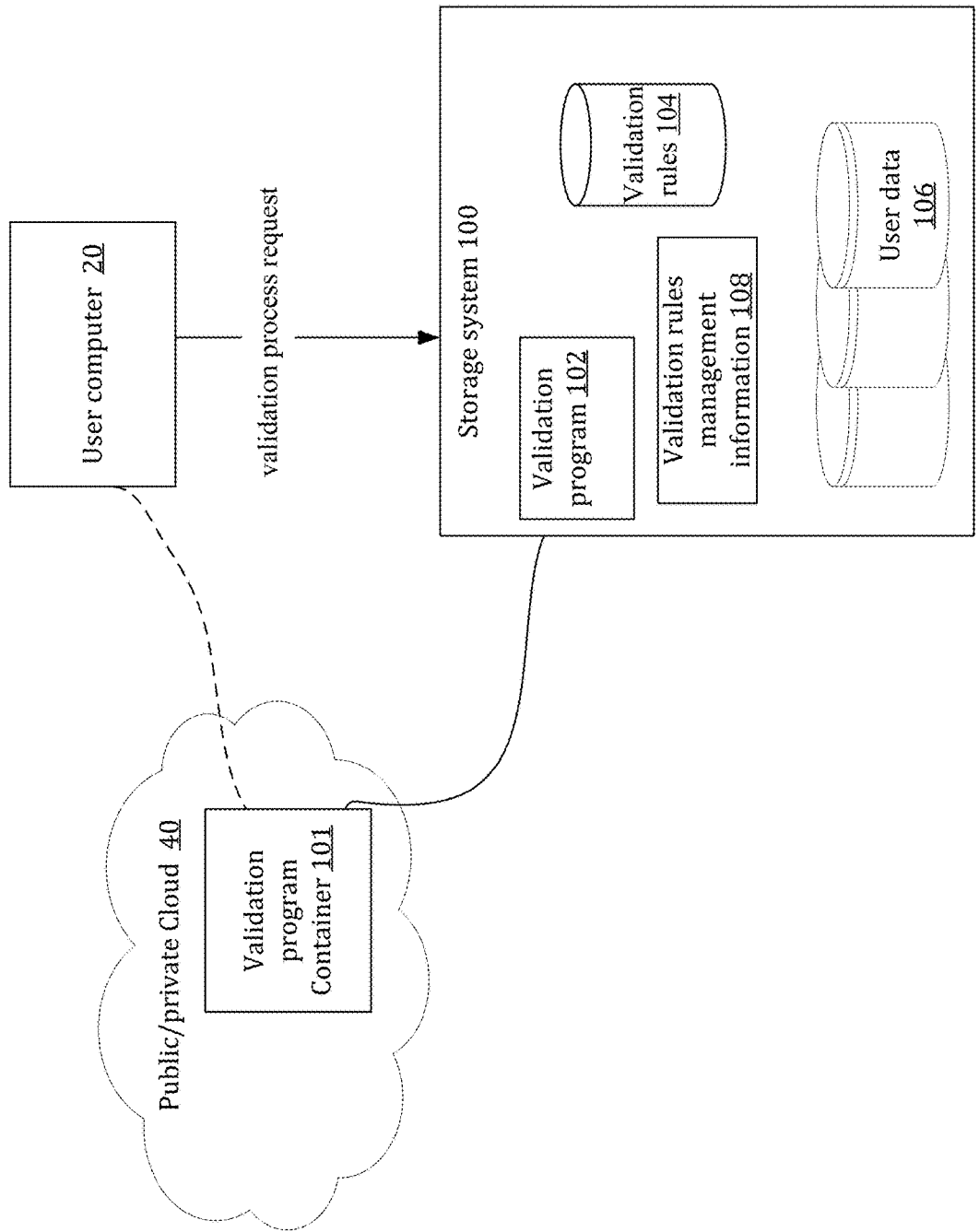
FIG. 2 is an example of a storage system and its environment.

FIG. 2 shows an example diagram of a storage system 100, an accessing entity such as a user computer 20 and a resource located out of the storage system—such as a cloud computing environment that may be private of public and is denoted "Public/private cloud 40". The Public/private cloud may be configured to store one or more containers such as validation program container. It should be noted that other resources outside the storage system may be provided. It may be noted that the method may be executed regardless of containers.

The storage system 100 is illustrated as storing a validation program (related to the user of user computer 20), user data 106 that is stored in the permanent storage devices of storage system 100 and includes a content to be validated by the validation program, validation rules 104 and validation rules management information 108 for controlling the deletion/amendment/addition of validation rules. The validation rules may be related to the user, may be related by multiple users, may be stored in one or more validation rules database. The storage system may store data of other users, may store multiple validation programs (related to one or more users), and the like. The validation program of a specific user may be stored and executed in the storage system, such as validation program 102. Alternatively, the validation program of the specific user may be stored and executed in a cloud container, such as validation program container 101.

Figure 3:
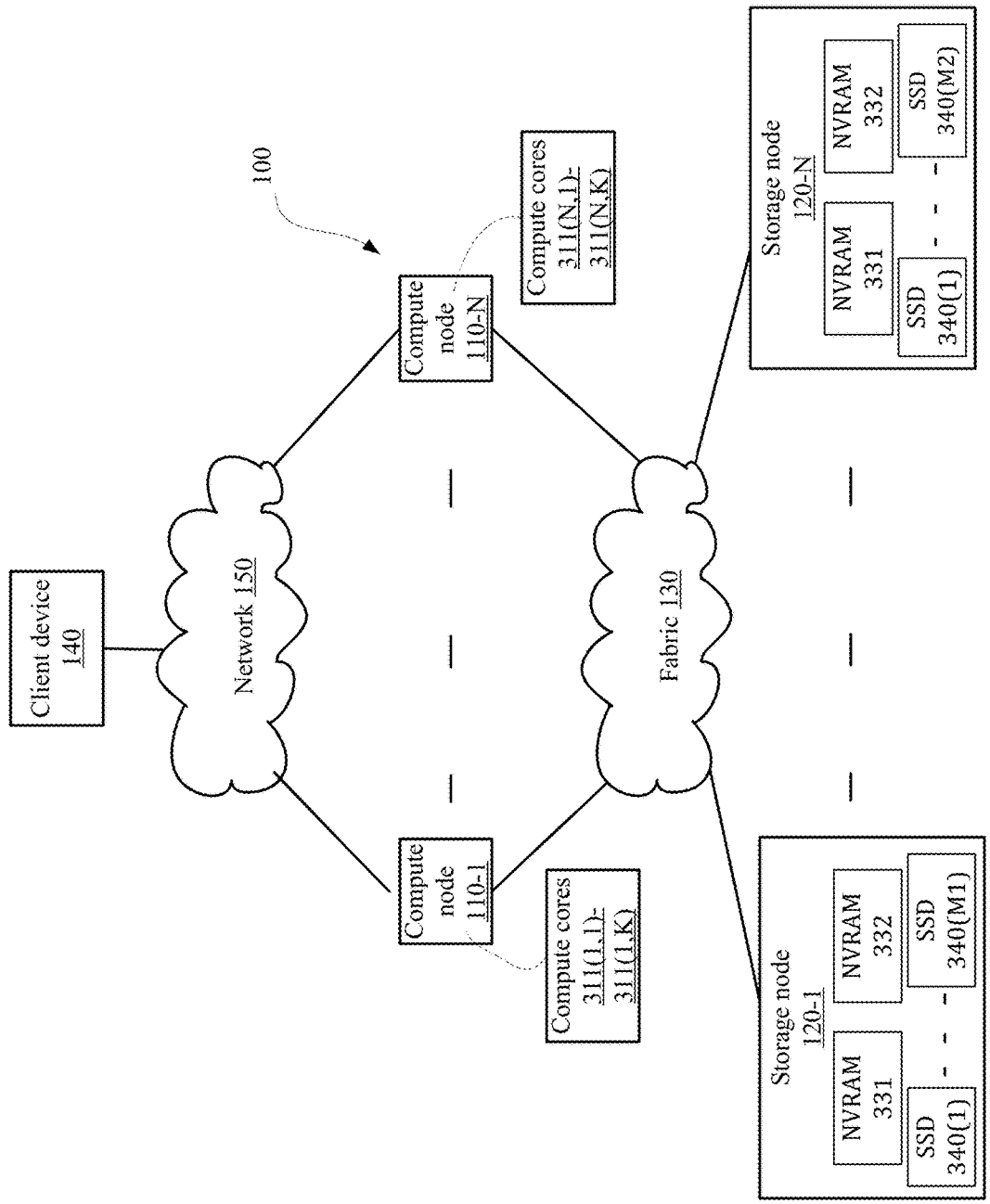
FIG. 3 is an example of a storage system.

FIG. 3 shows an example diagram of a storage system 100 where the compute resources are separate from the storage resources.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute cores 311(1,1)-311(1,K) and compute cores 311(N,1)-311(N,K). The validation process may be handled by any of the compute nodes 110.

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N. The validation rules 104 and any other information related to the validation may be stored in one or more storage nodes 120 or compute nodes 110.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware.

A compute node 110 is configured to perform tasks related to the management of the storage nodes 120. In an embodiment, each compute node 110 interfaces with multiple client devices such as a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, various filesystem protocols, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical level, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs, such as SSDs 340, for example storage node 120-1 includes M1 SSDs 340(1)-340(M1). Each storage node further includes fast accessed memory such as NVRAM 331 and 332 of FIG. 3A.

The storage nodes 120 may be configured to have the same capacity as each other or different capacities from each other. In an embodiment, the data stored in each storage node 120 is made redundant internally within the storage node, made redundant at a different storage node, or both.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniBand fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a compute node 110. In such a deployment, the system 100 does not communicate with an external network, e.g., the network 150. It should be further noted that the communication between the compute nodes 110 and the storage nodes 120 is facilitated over the fabric 130. It should be further noted that the compute nodes 120 can communicate with each other over the fabric 130. The fabric 130 is a shared fabric.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for user-defined validation of content stored in a storage system, the method comprises:
   receiving, from a user of the storage system, a request to execute a user-defined validation program (UDVP) on the content that is stored in the storage system and permitted to be accessed by the user; wherein the UDVP is provided by the user, wherein the request includes means for executing the UDVP, and a content identifier, wherein the request is associated with one or more triggers for triggering the executing of the UDVP, and wherein a trigger of the one or more triggers is a storage operation regarding at least a part of the content;
   scheduling, by the storage system, at least one execution of the UDVP;
   executing the UDVP according to the scheduling to provide one or more validation results;
   finding that the one or more validation results are indicative of potential security issues and performing one or more validation-triggered security measures; and
   delaying an execution of the storage operation, when a problem is detected by the execution of the UDVP, until fixing the problem.

2. The method according to claim 1 wherein the request is associated with scheduling information indicative of a requested timing of the at least one instance of execution of the UDVP; wherein the scheduling is responsive to the scheduling information.

3. The method according to claim 1 wherein an execution of the storage operation is responsive to a validation result provided by an execution of the instance of the UDVP.

4. The method according to claim 3 wherein the storage operation is selected out of generating a backup, deleting a backup, generating a snapshot, and deleting a snapshot.

5. The method according to claim 1 comprising applying one or more UDVP execution related security measures during the executing of the UDVP.

6. The method according to claim 5 wherein the one or more UDVP execution related security measures comprising applying one or more access control rules related to the user.

7. The method according to claim 1 wherein the means for executing the UDVP are included in a container that is stored outside the storage system.

8. The method according to claim 7 wherein the content identifier is attached to the container via a container storage interface.

9. The method according to claim 1 wherein the scheduling is responsive to availability of resources for executing the UDVP.

10. The method according to claim 1 comprising maintaining a data structure of validation rules to be applied during one or more UDVPs.

11. The method according to claim 10 comprising receiving a request to amend at least one validation rule and determining, based on at least one validation amendment rule, whether to accept the request.

12. The method according to claim 10 comprising receiving a request to delete at least one validation rule and determining, based on at least one validation amendment rule, whether to accept the request.

13. The method according to claim 10 comprising receiving a request from a first user to amend or delete at least one validation rule defined by a second user; and determining, based on at least one rule, whether to accept the request.

14. The method according to claim 1 comprising applying one or more preliminary security measures before the executing of the UDVP.

15. The method according to claim 14 wherein the applying of the one or more preliminary security measures comprises at least one out of scanning for vulnerabilities of the UDVP, and verifying an integrity of the UDVP.

16. The method according to claim 1 comprising maintaining a validation rules database.

17. The method according to claim 1 comprising treating the UDVP as a serverless application.

18. The method according to claim 1, wherein the storage system is prevented from performing content-aware validation of the content without executing the UDVP.

19. The method according to claim 1, wherein the content is encrypted and the means comprise encryption keys.

20. A non-transitory computer readable medium for user-defined validation of content stored in a storage system, the non-transitory computer readable medium stores instructions for:

receiving, from a user of the storage system, a request to execute a user-defined validation program (UDVP) on the content that is stored in the storage system and permitted to be accessed by the user; wherein the UDVP is provided by the user, wherein the request includes means for executing the UDVP, and a content identifier, wherein the request is associated with one or more triggers for triggering the executing of the UDVP, and wherein a trigger of the one or more triggers is a storage operation regarding at least a part of the content;

scheduling, by the storage system, at least one execution of the UDVP;

executing the UDVP according to the scheduling to provide one or more validation results;

finding that the one or more validation results are indicative of potential security issues and performing one or more validation-triggered security measures; and delaying an execution of the storage operation, when a problem is detected by the execution of the UDVP, until fixing the problem.

21. A storage system for user-defined validation of content stored in a storage system, the storage system comprises one or more processing circuitries configured to: receive, from a user of the storage system, a request to execute a user-defined validation program (UDVP) on the content that is stored in the storage system and permitted to be accessed by the user; wherein the UDVP is provided by the user, wherein the request includes means for executing the UDVP, and a content identifier, wherein the request is associated with one or more triggers for triggering the executing of the UDVP, and wherein a trigger of the one or more triggers is a storage operation regarding at least a part of the content; schedule, by the storage system, at least one execution of the UDVP; execute the UDVP according to the scheduling to provide one or more validation results; find that the one or more validation results are indicative of potential security issues and performing one or more validation-triggered security measures; and delay an execution of the storage operation, when a problem is detected by the execution of the UDVP, until fixing the problem.

* * * * *